United States Patent

[11] 3,544,715

| [72] | Inventors | Donald R. Herriott<br>Morris Township, Morris County;<br>Kenneth M. Poole, Bernardsville, New Jersey |
|---|---|---|
| [21] | Appl. No. | 655,934 |
| [22] | Filed | July 25, 1967 |
| [45] | Patented | Dec. 1, 1970 |
| [73] | Assignee | Bell Telephone Laboratories, Incorporated<br>Murray Hill, New Jersey<br>a corporation of New York |

[54] TELEPHONE-TELEVISION SUBSTATION APPARATUS
7 Claims, 3 Drawing Figs.

[52] U.S. Cl. .................................................. 178/7.85;
178/6; 313/110; 350/96
[51] Int. Cl. ..................................................... H04n 5/72
[50] Field of Search .......................................... 350/96,
276; 178/7.82, 7.85, 6(LCR); 313/110

[56] References Cited
UNITED STATES PATENTS

| 2,510,106 | 6/1950 | Henroteau | 178/7.85 |
| 2,895,005 | 7/1959 | Kock | 178/7.85 |
| 3,116,365 | 12/1963 | Prescott | 178/7.85 |
| 3,141,106 | 7/1964 | Kapany | 178/7.85 |
| 3,273,445 | 9/1966 | Siegmund | 178/6(LCR)UX |
| 3,295,968 | 1/1967 | Hamilton | 350/276 |
| 3,303,374 | 2/1967 | Fyler | 350/96 |

Primary Examiner—Robert L. Griffin
Assistant Examiner—Joseph A. Orsino, Jr.
Attorneys—R. J. Guenther and Arthur J. Torsiglieri ABSTRACT: The face plate of the kinescope tube of a telephone-television substation comprises an array of optic fibers each having an inner transparent portion surrounded by an outer light filtering portion. The central axes of the fibers approximately intersect the optic axis of the substation camera tube at a viewing plane. The refractive indices of the two portions are tailored to restrict the light output of each fiber to a region within the field of view of the camera tube. In order to see the kinescope display, the viewer must then locate his eyes within the field of view of the camera tube.

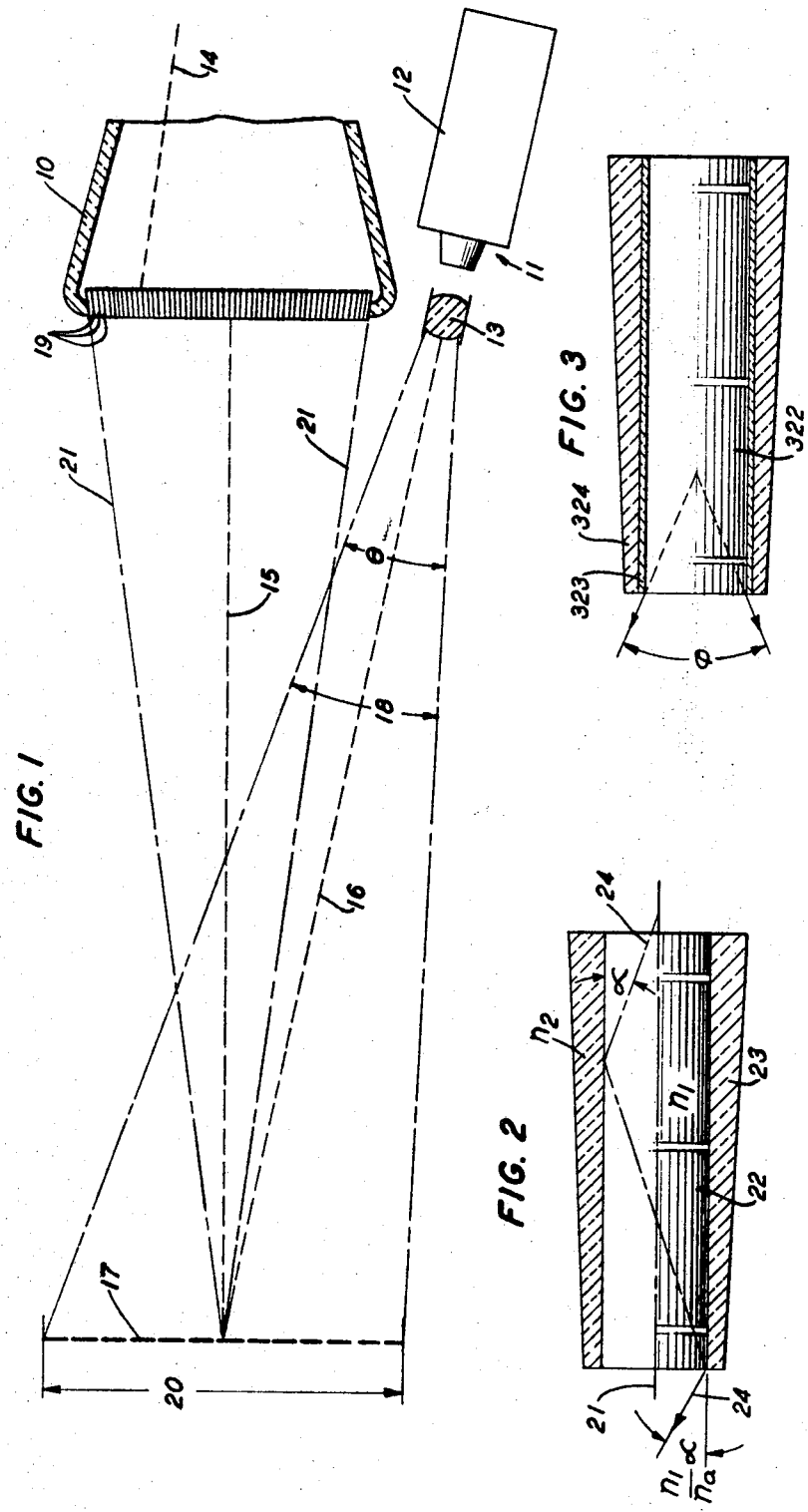

TELEPHONE-TELEVISION SUBSTATION APPARATUS

BACKGROUND OF THE INVENTION

In telephone-television systems it is important that the substation subscriber orient himself within the field of view of the television camera when he is operating the substation so that he can be observed by the party with whom he is communicating. The patent of W. E. Kock, et al., U.S. Pat. No. 2,895,005, the patent of R. E. Prescott U.S. Pat. No. 3,116,365, and the copending patent application of W. T. Rea, U.S. Pat. application Ser. No. 605,931, filed Dec. 29, 1966 now U.S. Pat. No. 3,495,908, and assigned to Bell Telephone Laboratories, Incorporated, describe various signaling devices by which the viewer can determine that he is within the field of view of the television camera. It has been observed, however, that because telephone-television communication has the attributes of face-to-face conversation, the viewer is usually not consciously aware of his appearance to the other party. When his attention is directed to the image of the other party, he may not notice visual warnings intended to keep him within the field of view of the camera.

SUMMARY OF THE INVENTION

It is an object of this invention to provide improved telephone-television substation apparatus.

It is another object of the invention to constrain the operator of telephone-television substation apparatus to orient himself within the field of view of the television camera of the substation.

These and other objects of the invention are attained in an illustrative embodiment thereof comprising a kinescope display tube and a television camera tube. Associated with the camera tube is a viewing lens having an optic axis and a limited field of view. The optic axis of the viewing lens approximately intersects the central axis of light projected from the kinescope tube at a point which is appropriate for viewing of the kinescope display.

In accordance with one feature of the invention, the face plate of the camera tube comprises an array of optic fibers each having a central light transmitting portion having an index of refraction $n_1$ which is surrounded by an outer light filtering portion having an index of refraction $n_2$. The maximum angle at which light is emitted from each of the fibers is a function of the ratio of $n_2$ to $n_1$, and this ratio is chosen such that, at the viewing plane, light from the kinescope tube is distributed over a region within the field of view of the camera tube. Light which is within the maximum or critical angle is reflected by the filter portion so that it can be transmitted through the fiber, while light exceeding the critical angle is absorbed by the filter portion which may be made of black glass. When light is reflected by black glass, it is attenuated to some extent due to a small penetration of the light before reflection.

In an alternative embodiment, reflective losses are reduced by making the light filtering portion of a transparent reflecting layer surrounded by an absorbing layer of black glass. The transparent layer has a refractive index $n_2$ and reflects light without substantial loss within the critical angle, while unreflected light is absorbed by the outer layer of black glass as before.

According to another feature of the invention, all of the optic fibers have central axes which approximately intersect the optic axis of the camera viewing lens at the viewing plane. With this provision, the viewer will not be able to see any part of the displayed image without orienting his eyes within the field of view of the camera tube. In the absence of this provision, it may be possible for the viewer to see part of the displayed image outside the field of view.

DESCRIPTION OF THE DRAWINGS

These and other objects and features of the invention will be better understood from the consideration of the following detailed description taken in conjunction with the accompanying drawing in which:

FIG. 1 is a schematic illustration of part of a telephone-television substation in accordance with the invention;

FIG. 2 is a sectional view of an optic fiber that may be used in the face plate of the kinescope tube of FIG. 1; and FIG. 3 is a sectional view of another optic fiber that may alternatively be used in the apparatus of FIG. 1.

DETAILED DESCRIPTION

Referring now to FIG. 1 there is shown a schematic illustration of part of a telephone-television substation comprising a kinescope display tube 10 and a television camera 11 including a camera tube 12 and a viewing lens 13. Images formed in the kinescope tube by a scanning electron beam 14 are projected along a path having a mean central axis 15. The viewing lens 13 has an optic axis 16 which approximately intersects the central axis 15 at a viewing plane 17. The viewing lens 13 images objects within a field of view 18, which subtends a plane angle $\theta$, onto the camera tube 12 in a conventional manner. If the viewer orients his eyes at approximately the intersection of axes 15 and 16, he can clearly observe the displayed image while his own image is recorded and transmitted by the television camera 11.

In accordance with the invention, the face plate of the kinescope tube 10 comprises an array of optic fibers 19, each of which has a central axis 21 that approximately intersects axes 15 and 16 at the viewing plane 17. The purpose of the optic fibers is to restrict the projection of light from the kinescope tube to a region 20 along viewing plane 17 that corresponds to the field of view 18 of the television camera at that plane. Thus, in order to observe the displayed image of the kinescope tube, it is necessary for the viewer to locate his head within the field of view of the television camera for proper transmission of his own image; this obviates the necessity for signal devices to constrain the viewer to maintain himself within the field of view.

Referring to FIG. 2, each optic fiber comprises a cylindrical central transparent glass portion 22 surrounded by a filter portion 23 of highly absorbing or black glass. The ratio of the index of refraction $n_1$ of the transparent portion 22 with respect to the index of refraction $n_2$ of the filter portion 23 is chosen so that only light within a specific $\alpha$ is emitted by the fiber. Light having an angle greater than $\alpha$ with respect to the central axis is absorbed by the filter portion 23.

As is known, the light transmitted in a medium having a refractive index $n_1$ will be internally reflected at an interface with a medium having a refractive index $n_2$ if the light ray describes with the interface an angle equal to or smaller than a critical angle $\alpha$ defined by the relation, $$\cos \alpha = \frac{n_2}{n_1} \quad (1)$$

Note that $\alpha$ is equal to 90° minus the angle of incidence. Any light ray describing with the interface an angle larger than the critical angle $\alpha$ will be transmitted through the interface. Hence, in FIG. 2, light ray 24 represents light of the largest angle with respect to the optic fiber axis that is transmitted by the fiber; any ray forming a larger angle is absorbed by the filter portion 23. To be technically precise, light at exactly the angle $\alpha$ should be shown as being reflected in a direction parallel to the interface. The illustration presented, however, is intended to show clearly how the angle of emitted light is restricted by the selective filtering of outer layer 23.

Emitted light from the fiber is refracted by the atmosphere by an angle equal to the ratio of the refractive index $n_1$ of the central fiber portion 22 to the refractive index of the atmosphere $n_a$. Thus, ray 24 is emitted from the fiber at an angle $\frac{n_1 \alpha}{n_a}$ with respect to the central axis of the fiber. All light emitted from the fiber is within this angle, and the maximum plane angle subtended by the total light emitted from the end of each fiber is equal to $2\frac{n_1 \alpha}{n_a}$. For convenience, this angle will be designated as the maximum light emission angle $\Phi$ where, $$\varphi = 2\frac{n_1 a}{n_a} \quad (2)$$

The angle Φ is illustrated in FIG. 3.

If Φ is equal to or smaller than the angle θ of the field of view of FIG. 1, light projected from each fiber will be distributed within the region 20 of the viewing plane 17 corresponding to the field of view of the camera. Hence, a viewer can observe the displayed image only by locating himself within the field of view of the camera when the following condition is met, $$\varphi \leq \theta \quad (3)$$

From relationship (2), $$\alpha \leq \frac{n_a}{2n_1}\theta \quad (4)$$

and from Equation (1), $$\cos\left(\frac{n_a}{2n_1}\theta\right) \leq \frac{n_2}{n_1} \quad (5)$$

In the typical substation, the viewing plane 17 is approximately 40 inches from the television camera and the field of view subtends an angle θ of approximately 20°, giving the region 20 on the viewing plane 17 a diameter of approximately 14 inches. If the angle Φ is equal to θ, the viewer will be able to see the displayed image over a region having the same 14-inch diameter. If the viewer sees the image with both eyes, both eyes will be within the field of view of the camera tube, but they will not necessarily be centered within the field of view.

If it is desired to constrain the viewer not only to remain within the field of view, but also to center himself within the field of view, the ratio of refractive indices $n_1$ and $n_2$ may be tailored to give a smaller range of visibility of the displayed image within the field of view. For example, if the refractive indices are arranged to make the angle Φ equal to 4°, light projected from the kinescope tube will be centered on central axis 15 and will be distributed over a region having a diameter of 5.6 inches. While making the illuminated area this small would insure precise centering of the viewer, it would also be somewhat difficult for the viewer to find the image, and for most practical cases Φ should be greater than 4°. In any event, the ratio of refractive indices should be less than 1 to give some internal reflection with a reasonable distribution of illuminance, or, $$\cos\left(\frac{n_a}{2n_1}\theta\right) \leq \frac{n_2}{n_1} < 1 \quad (6)$$

The diameter of the optic fibers should be small enough to give a resolution of the displayed image that is consistent with the resolution capacity of the kinescope tube. The length of each fiber should be sufficient to insure interception of any ray transmitted at angle with respect to the central axis 21 of the fiber that exceeds the critical angle α. Each fiber may typically have an outside diameter of 0.01 inch, a diameter of the transparent portion 22 of 0.009 inch, and a length of 0.4 inch.

The outer surface of each fiber is preferably tapered as shown in FIG. 2 at an appropriate angle such that, when the array is assembled, the fibers converge as shown in FIG. 1. Although it is preferable that the fibers converge as shown, it is not essential. However, if the fibers are parallel, the entire projected image will be observable only at a region at which light from all of the fibers overlap, and such a region might be quite small or nonexistent depending on the critical angle of each fiber that has been chosen. For example, if the diameter of the face plate is 6 inches, there will be a 6 inch wide peripheral region on viewing plane 20 on which only part of the display can be observed. If the maximum angle Φ of emitted light is 10°, as described before, the light from each fiber will be distributed over 14 inches, the total light distribution will have a 20-inch diameter, and there will be only an 8-inch diameter central region of complete overlap at which the entire display can be observed. Consequently, practical employment of our invention requires convergence of the fibers and preferably convergence to a point on the viewing plane as described before.

Outer layer 23 of each optic fiber is made of absorbing or black glass so that any light which is transmitted by it is absorbed before it is transmitted to the adjacent fiber. While the transmittance of layer 23 should be low enough to absorb any unreflected light, it should not be so low as to absorb reflected light which penetrates a few wavelengths into layer 23 before it is reflected. With the dimensions described above, the transmittance of layer 23 may be on the order of $10^{-3}$ per centimeter.

Referring to FIG. 3, the filter portion comprises a transparent reflecting layer 323 surrounded by an outer absorbing layer 324 made of low transmittance black glass. The reflecting layer 323 has a refractive index $n_2$ which is appropriate for reflecting light below a critical angle α as described before. However, since it is transparent, light which reflected from it is not attenuated even though it penetrates a few wavelengths into layer 323 before it is reflected. The refractive index $n_3$ of the absorbing layer 324 should be equal to or greater than the refractive index $n_2$ of the reflecting layer 323 in order to avoid reflection of light at the interface of layers 323 and 324. Layer 323 may be on the order of several wavelengths thick, or whatever thickness is convenient and consistent with good absorption by the absorbing layer 324.

The various embodiments shown and described are merely illustrative of the inventive concept. Various other embodiments and modifications may be made by those skilled in the art without departing from the spirit and scope of the invention.

We claim:

1. In a television transmitting and receiving substation of the type comprising a kinescope display tube for forming and projecting light along a path having a first central axis, a television camera responsive to light within a field of view having a second central axis, the television camera being located with respect to the display tube such that the first and second central axes approximately intersect at a prescribed distance from the display tube, the improvement comprising:
    means for limiting the visibility of the projected light to a region within the field of view of the television camera comprising a face plate on the kinescope tube comprising an array of optic fibers each having a third central axis;
    each optic fiber including light filtering means for restricting the maximum angle subtended by light emitted therefrom to an angle that is smaller than the angle subtended by the field of view; and
    each optic fiber being tapered and being arranged at an appropriate angle such that all of the third axes converge to a point at substantially the location of the intersection of the first and second central axes.

2. In a television transmitting and receiving substation of the type comprising a kinescope tube for forming and projecting light along a path having a first central axis, a television camera tube responsive to light within a field of view subtending a plane angle θ and having a second central axis, the camera tube being located with respect to the kinescope tube such that the first and second central axis approximately intersect at a prescribed distance from the kinescope tube which is appropriate for viewing kinescope displays, the improvement comprising:
    a face plate on the kinescope tube comprising an array of optic fibers;
    each optic fiber comprising a light transmitting portion having a refractive index $n_1$ surrounded by a light filter portion having a refractive index $n_2$;
    the ratio of the refractive indices of each optic fiber substantially conforming to the relationship $$\cos\left(\frac{n_a\theta}{2n_1}\right) \leq \frac{n_2}{n_1} < 1 \quad (7)$$

where $n_a$ is the refractive index of the atmosphere, whereby a viewer must locate his eyes within the field of view of the television camera tube to see a complete kinescope display; and said array being flared such that the central axes of the fibers converge to a common point at approximately said prescribed distance from the kinescope tube, whereby optimum viewing occurs at an optimum location for television transmission of the viewer's image by the camera tube.

3. The improvement of claim 2 wherein the light filter portion of each fiber is made of light absorbing material, whereby any light that is not reflected by the light filter portion is absorbed.

4. The improvement of claim 3 wherein the light filter portion of each filter comprises a transparent reflecting layer having a refractive index $n_2$ surrounded by a layer of light absorbing material, whereby any light that is not reflected by the reflecting layer is absorbed by the absorbing layer, but reflected light is reflected without substantial attenuation.

5. The improvement of claim 2 wherein each optic fiber is tapered such that its end nearest the point of intersection of said axes is of smaller diameter than its opposite end, whereby said array of fibers may be closely bound together.

6. The improvement of claim 5 wherein the light filter portion of each fiber comprises light absorbing material for absorbing any light that is not internally reflected by the fiber.

7. The improvement of claim 6 wherein the light filter portion comprises a transparent layer of refractive index $n_2$ surrounded by a light absorbing layer having a refractive index that is equal to or greater than $n_2$.